J. V. ROBINSON.
AUTOMATIC TRAIN PIPE CONNECTOR.
APPLICATION FILED AUG. 18, 1915. RENEWED SEPT. 13, 1917.

1,245,800.

Patented Nov. 6, 1917.
3 SHEETS—SHEET 3.

Witness
BM. Offutt

Inventor
Joseph V. Robinson
James A. Watson
By
Attorney

UNITED STATES PATENT OFFICE.

JOSEPH V. ROBINSON, OF BRANFORD, CONNECTICUT.

AUTOMATIC TRAIN-PIPE CONNECTOR.

1,245,800.  Specification of Letters Patent.  Patented Nov. 6, 1917.

Application filed August 18, 1915, Serial No. 46,135. Renewed September 13, 1917. Serial No. 191,315.

*To all whom it may concern:*

Be it known that I, JOSEPH V. ROBINSON, a citizen of the United States, and resident of Branford, county of New Haven, State of Connecticut, have invented certain new and useful Improvements in Automatic Train-Pipe Connectors, of which the following is a specification.

The object of my invention is to provide an improved support for yieldingly supporting the coupling head of an automatic train pipe connector, which will be simple and effective and which will offer but slight resistance to universal movement of the coupling head, when in the coupled position, and the maximum resistance to longitudinal movement thereof.

To this end my invention consists of the combinations, constructions and improvements hereinafter described, pointed out in the appended claims and illustrated in the accompanying drawing.

Figure 3:
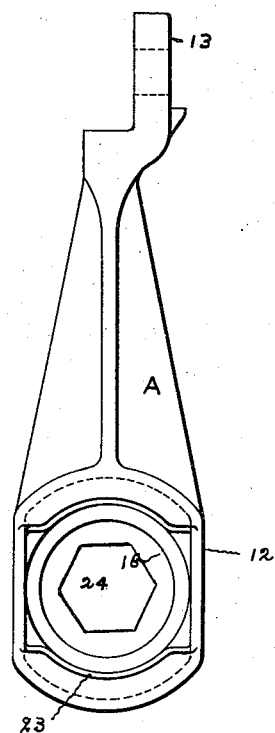
Fig. 3 is a front view of the bracket comprising a part of my invention.
Figure 4:
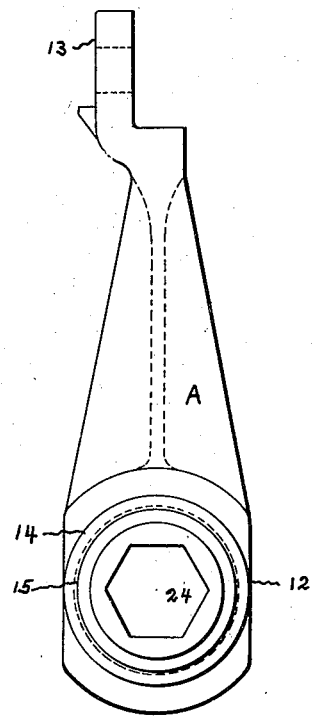
Fig. 4 is a rear view of the structure shown in Fig. 3.
Figure 5:
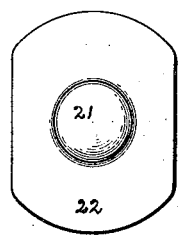
Fig. 5 is a rear view of the flange 21.

Referring to the drawing: I secure my improved support to the lug 9 of the usual car coupler 10 as by bolts 11. The support comprises among other things a one piece bracket A, having at its lower end a chamber or base 12, and at its upper end a boss 13, through which pass the bolts 11. The bracket is provided with a cylindrical projection 14 into which is screwed the barrel or sleeve 15. Within the barrel and projecting into the chamber 12 I mount a buffer spring C one end of which rests against a shoulder 16 of the barrel and the other end of which rests upon a plate or member 17 having an annular bearing 18 embraced by said spring and having also a shoulder 19 against which the spring abuts. The plate is provided with a socket or a semi-spherical concave seat 20, in which is mounted a semi-spherical boss 21 projecting from the rear face of the flange 22. The flange is slightly oblong as shown in Fig. 5 and fits loosely in the chamber 12 which is of corresponding shape, as shown in Figs. 3 and 4, to prevent undue rotation of the coupling head D about its longitudinal axis. The flange normally abuts inwardly extending projections 23 formed at the forward end of the chamber 12 of the base A, and is held tightly there against by the spring C, the latter being placed under the desired compression by screwing inwardly the barrel 15. A hexagonal opening 24 is provided in the barrel for this purpose.

Figure 1:
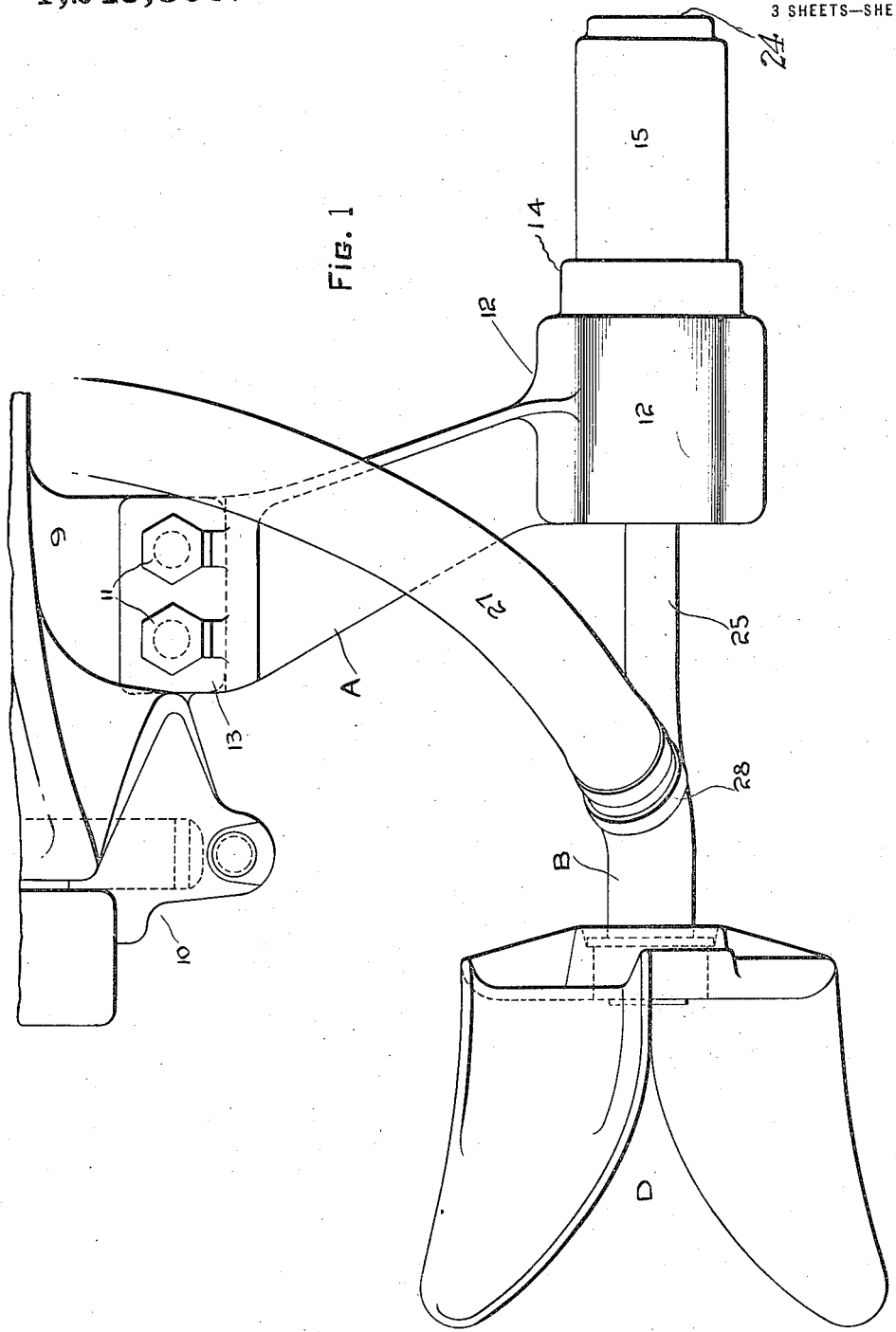
Figure 1 is a side elevation of my improvement.
Figure 2:
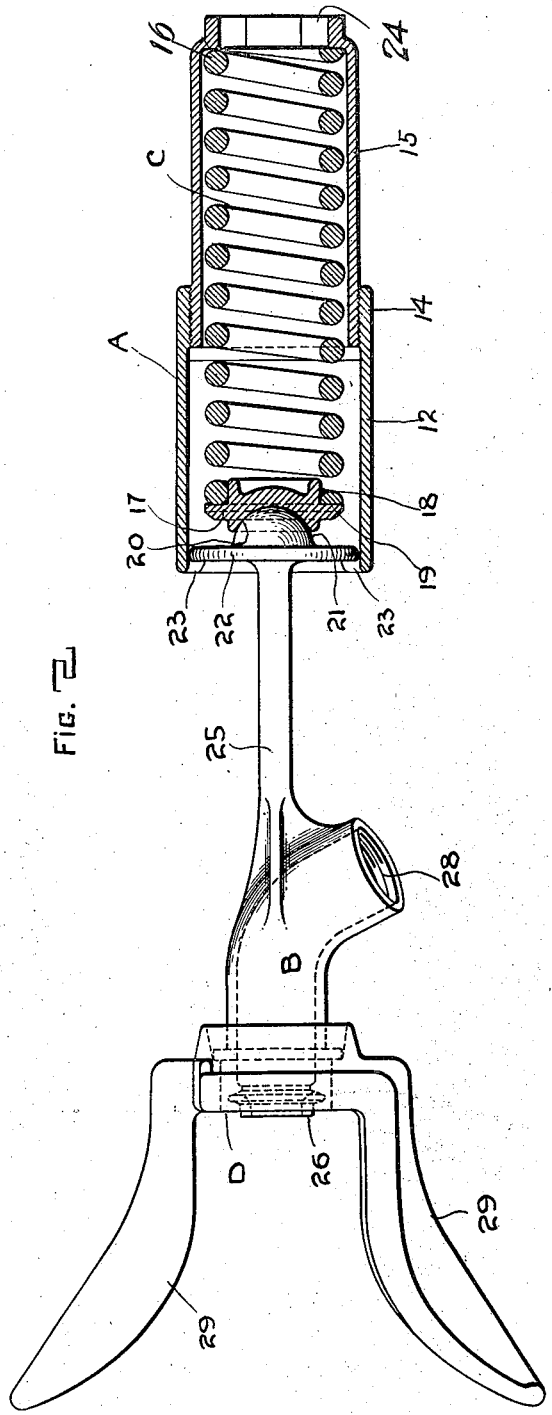
Fig. 2 is a horizontal section through the base of the bracket of my improvement showing in detail the construction thereof.

Projecting forwardly from the front face of the flange 22 I provide a stem 25 carrying at its forward end a curved fitting or fluid conduit B to which is suitably secured the coupling head D. I preferably press the fitting into the head, as shown in Figs. 1 and 2, and mount in it a suitable gasket 26 adapted to make a butt joint with a complementary gasket of an opposing coupling head, but the head may be otherwise mounted on the fitting if desired. The usual train pipe hose 27 is suitably connected to the fitting B as at 28.

Figure 6:
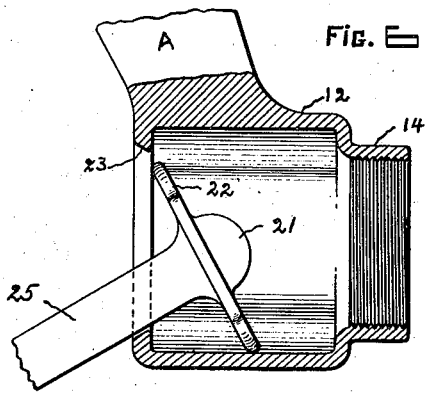
Fig. 6 is a vertical section through the base of the bracket of my invention showing the manner of assembling the flange 21 therein.

The foregoing few parts comprise my improved support. They are assembled by first mounting the head D on the fitting B, then turning the head and fitting downwardly, when the flange may be placed into the chamber 12 as shown particularly in Fig. 6. The plate 17 is then mounted on the boss 21 after which the buffer spring C is placed in position on the plate and the barrel 15 is screwed into the projection 14 until the spring presses the flange 22 against the projections 23 with sufficient force to properly maintain the coupling head D in the normal coupling position. The bracket is then bolted to the lug 9 as by bolts 11 and the hose 27 is connected to the nipple B which completes the assembly.

It is obvious that when two cars come together in the act of coupling my improved support will permit the movement of the heads required to negotiate curves, etc., the prongs 29 of the heads serve to aline the gaskets 26 and insure accurate registration of the gaskets 26. When the coupling heads are seated, further movement of the cars will push the stem 25 rearwardly compressing the spring C and freeing the flange 22 from its abutting engagement with the projections 23, at which time the only resistance to universal movement of the heads will be the slight friction occurring in the socket 20 of the plate 17, while the full force of the spring C will be utilized to force the heads together. This arrangement gives the maximum locking effect of the springs acting upon the heads and practically eliminates all the strains that tend to open the heads in rounding curves, etc. A highly efficient joint in which mating gaskets will rest in constant contact at all times irrespective of the sharp whipping movement of running cars, is thus obtained without the use of locks or complex parts of any kind.

The various members of my improvement are, of course, so proportioned that the necessary relative movement between them, to meet all conditions of service, may be had.

Having thus described my said invention what I claim as new and desire to secure by Letters Patent is:

1. In an automatic train pipe connector, the combination of a coupling head, a fluid conduit leading therefrom, a bracket having a hollow base, a stem connected with said conduit and extending into the hollow of said base and having a partly spherical portion, a member seated on said spherical portion and having a socket for receiving the same, a spring mounted on said member, the member and the spring being within the hollow of said base, and a sleeve surrounding said spring and screwed in to said base and having a shoulder against which the spring rests.

2. In an automatic train pipe connector the combination of a coupling head, a fluid conduit leading therefrom, a bracket having a hollow base, a stem connected with said conduit and extending into the hollow of said base and terminating in a flange which lies in said base and on which is provided a partly spherical boss, said base being slightly oblong in cross section and said flange being of corresponding outline, a member seated on said boss and having a socket for receiving the same, a spring mounted on said member, a threaded projection on said base, and a sleeve screwed into said projection and embracing said spring.

3. In an automatic train pipe connector, the combination of a perforated coupling head, a curved conduit leading from said perforation, a gasket projecting in front of the face of said head, a hollow base having an inwardly extending projection, a stem leading rearwardly from the rear face of said conduit and projecting into said base, a flange on said stem and having a partly spherical boss, the flange being within the hollow of said base and adapted to move forward and backward therein, means in said base for preventing rotation of said flange about the longitudinal axis of said stem, a member mounted on said boss and having a partly spherical socket for receiving the boss and having also an annular seat, a spring mounted on said seat and tending normally to project said coupling head forwardly of said base and press said flange against said projection and a cylindrical barrel surrounding said spring at the rear of said base and adapted to be screwed into the latter to place said spring under compression.

In testimony whereof, I have hereunto set my hand in the presence of two witnesses.

JOSEPH V. ROBINSON.

In the presence of—
G. E. MATHESON,
HAZEL F. MARTIN.